(12) United States Patent
Cheng

(10) Patent No.: US 8,108,727 B2
(45) Date of Patent: *Jan. 31, 2012

(54) SYSTEM AND METHOD TO LOCATE AND CORRECT SOFTWARE ERRORS WITHIN A PROTOCOL STACK FOR WIRELESS DEVICES

(75) Inventor: Matthew Cheng, Avenel, NJ (US)

(73) Assignee: Broadcom Corporation, Irvine, CA (US)

( * ) Notice: Subject to any disclaimer, the term of this patent is extended or adjusted under 35 U.S.C. 154(b) by 275 days.

This patent is subject to a terminal disclaimer.

(21) Appl. No.: 12/344,031

(22) Filed: Dec. 24, 2008

(65) Prior Publication Data

US 2009/0106599 A1 Apr. 23, 2009

Related U.S. Application Data

(63) Continuation of application No. 10/967,043, filed on Oct. 15, 2004, now Pat. No. 7,487,396.

(51) Int. Cl.
*G06F 11/00* (2006.01)
(52) U.S. Cl. .............. 714/28; 714/38.1; 703/21; 703/22
(58) Field of Classification Search .................. None
See application file for complete search history.

(56) References Cited

U.S. PATENT DOCUMENTS

| | | | | |
|---|---|---|---|---|
| 5,544,175 A * | 8/1996 | Posse | ............... | 714/736 |
| 5,794,128 A * | 8/1998 | Brockel et al. | ............. | 455/67.11 |
| 5,903,475 A * | 5/1999 | Gupte et al. | ..................... | 703/16 |
| 5,983,001 A * | 11/1999 | Boughner et al. | ............. | 714/38 |
| 6,052,524 A * | 4/2000 | Pauna | .............................. | 703/22 |
| 6,083,269 A * | 7/2000 | Graef et al. | ..................... | 703/14 |
| 6,192,108 B1 * | 2/2001 | Mumford et al. | ................. | 379/9 |
| 6,199,032 B1 * | 3/2001 | Anderson | ........................ | 703/21 |
| 6,269,330 B1 * | 7/2001 | Cidon et al. | ..................... | 714/43 |
| 6,332,201 B1 * | 12/2001 | Chin et al. | ....................... | 714/28 |
| 6,516,051 B2 * | 2/2003 | Sanders | ...................... | 379/10.03 |
| 6,549,882 B1 * | 4/2003 | Chen et al. | ....................... | 703/21 |
| 6,581,052 B1 * | 6/2003 | Slutz | ..................................... | 1/1 |
| 6,603,327 B1 * | 8/2003 | Seubert | ......................... | 324/765 |
| 6,684,169 B2 * | 1/2004 | Masella et al. | .................. | 702/66 |
| 6,687,662 B1 * | 2/2004 | McNamara et al. | ............. | 703/14 |
| 6,813,702 B1 * | 11/2004 | Ramey et al. | .................... | 712/23 |
| 6,862,682 B2 * | 3/2005 | Louden et al. | ..................... | 713/2 |
| 6,922,395 B1 * | 7/2005 | Elliott et al. | ..................... | 370/241 |
| 6,963,997 B2 * | 11/2005 | Maly et al. | ...................... | 714/20 |
| 6,986,125 B2 * | 1/2006 | Apuzzo et al. | ................. | 717/124 |
| 7,002,949 B2 * | 2/2006 | Garcia-Luna-Aceves et al. | ............................. | 370/351 |

(Continued)

*Primary Examiner* — Christopher McCarthy
(74) *Attorney, Agent, or Firm* — Garlick Harrison & Markison; Shayne X. Short

(57) ABSTRACT

The present invention provides a method to test a protocol stack operable to be loaded to a wireless terminal. This involves the creation of simulation scripts from prior test case logs associated with a prior test case executed on a physical wireless terminal. When the prior test case is failed on a physical device, the simulation scripts are used to locate and correct errors in protocol stack. The simulation scripts are then stored within and retrieved from a library. These simulations scripts are loaded within a simulation environment within computer systems such as a personal computer. The simulation scripts are executed on the protocol stack within the simulation environment to produce a set of results. These results are then compared to a reference log, wherein a favorable comparison indicates a satisfactory simulation. Should an unfavorable comparison result, the protocol stack may be revised. The above process may then be repeated on the revised protocol stacks following the detection, location and correction of errors within the protocol stack.

20 Claims, 13 Drawing Sheets

U.S. PATENT DOCUMENTS

| | | | | |
|---|---|---|---|---|
| 7,035,784 B1* | 4/2006 | Gillis | | 703/17 |
| 7,075,893 B1* | 7/2006 | Mlinarsky et al. | | 370/241 |
| 7,165,201 B2* | 1/2007 | Groz | | 714/741 |
| 7,191,326 B2* | 3/2007 | Louden et al. | | 713/1 |
| 7,239,978 B2* | 7/2007 | Cheng et al. | | 702/185 |
| 7,286,802 B2* | 10/2007 | Beyme et al. | | 455/67.14 |
| 7,305,466 B1* | 12/2007 | Kaffine et al. | | 709/224 |
| 7,319,847 B2* | 1/2008 | Xanthos et al. | | 455/67.11 |
| 7,325,048 B1* | 1/2008 | Milito et al. | | 709/220 |
| 7,487,396 B2* | 2/2009 | Cheng | | 714/28 |
| 7,765,093 B2* | 7/2010 | Li et al. | | 703/13 |
| 7,774,440 B1* | 8/2010 | Bagrodia et al. | | 709/221 |
| 2002/0061001 A1* | 5/2002 | Garcia-Luna-Aceves et al. | | 370/338 |
| 2003/0013412 A1* | 1/2003 | Kardach et al. | | 455/41 |
| 2003/0037314 A1* | 2/2003 | Apuzzo et al. | | 717/125 |
| 2003/0045298 A1* | 3/2003 | Linton et al. | | 455/452 |
| 2003/0125020 A1* | 7/2003 | Sauriol et al. | | 455/425 |
| 2005/0004787 A1* | 1/2005 | Kubischta et al. | | 703/19 |
| 2005/0055196 A1* | 3/2005 | Cohen et al. | | 703/25 |
| 2005/0165919 A1* | 7/2005 | Qian et al. | | 709/223 |
| 2006/0009159 A1* | 1/2006 | Leung | | 455/67.11 |
| 2006/0229018 A1* | 10/2006 | Mlinarsky et al. | | 455/67.11 |
| 2007/0006036 A1* | 1/2007 | Devas et al. | | 714/38 |
| 2008/0222463 A1* | 9/2008 | Parthasarathy et al. | | 714/712 |

* cited by examiner

SYSTEM AND METHOD TO LOCATE AND CORRECT SOFTWARE ERRORS WITHIN A PROTOCOL STACK FOR WIRELESS DEVICES

CROSS REFERENCE TO RELATED PATENTS/PATENT APPLICATIONS

Continuation Priority Claim, 35 U.S.C. §120

The present U.S. Utility patent application claims priority pursuant to 35 U.S.C. §120, as a continuation, to the following U.S. Utility patent application which is hereby incorporated herein by reference in its entirety and made part of the present U.S. Utility patent application for all purposes:

1. U.S. Utility application Ser. No. 10/967,043, entitled "System and method to locate and correct software errors within a protocol stack for wireless devices,", filed Oct. 15, 2004, pending.

BACKGROUND OF THE INVENTION

1. Technical Field of the Invention

The present invention relates generally to cellular wireless communication systems, and more particularly to a system and method to detect, locate and correct errors within a protocol stock to be implemented within a wireless terminal.

2. Description of Related Art

Cellular wireless communication systems support wireless communication services in many populated areas of the world. While cellular wireless communication systems were initially constructed to service voice communications, they are now called upon to support data and video (multimedia) communications as well. The demand for video and data communication services has exploded with the acceptance and widespread use of evermore capable wireless terminals and the Internet. Cellular wireless users now demand that their wireless units also support video and data communications. The demand for wireless communication will only increase with time. Thus, manufacturers of cellular wireless communication systems are currently attempting to service these burgeoning demands. As the market for wireless terminals matures and penetration rates reach saturation, manufacturers are faced with the challenge of introducing a growing number of features within shortening development timescales.

Cellular wireless networks include a "network infrastructure" that wirelessly communicates with wireless terminals within a respective service coverage area. The network infrastructure typically includes a plurality of base stations dispersed throughout the service coverage area, each of which supports wireless communications within a respective cell (or set of sectors). The base stations couple to base station controllers (BSCs), with each BSC serving a plurality of base stations. Each BSC couples to a mobile switching center (MSC). Each BSC also typically directly or indirectly couples to the Internet.

In operation, each base station communicates with a plurality of wireless terminals operating in its cell/sectors. A BSC coupled to the base station routes voice, video, data or multimedia communications between the MSC and a serving base station. The MSC then routes these communications to another MSC or to the PSTN. Typically, BSCs route data communications between a servicing base station and a packet data network that may include and couple to the Internet. Transmissions from base stations to wireless terminals are referred to as "forward link" transmissions while transmissions from wireless terminals to base stations are referred to as "reverse link" transmissions. The volume of data transmitted on the forward link typically exceeds the volume of data transmitted on the reverse link. Such is the case because data users typically issue commands to request data from data sources, e.g., web servers, and the web servers provide the data to the wireless terminals. The great number of wireless terminals communicating with a single base station forces the need to divide the forward and reverse link transmission times amongst the various wireless terminals.

Wireless links between base stations and their serviced wireless terminals typically operate according to one (or more) of a plurality of operating standards. These operating standards define the manner in which the wireless link may be allocated, setup, serviced and torn down. One popular cellular standard is the Global System for Mobile telecommunications (GSM) standard. The GSM standard, or simply GSM, is predominant in Europe and is in use around the globe. While GSM originally serviced only voice communications, it has been modified to also service data communications. GSM General Packet Radio Service (GPRS) operations and the Enhanced Data rates for GSM (or Global) Evolution (EDGE) operations coexist with GSM by sharing the channel bandwidth, slot structure, and slot timing of the GSM standard. GPRS operations and EDGE operations may also serve as migration paths for other standards as well, e.g., IS-136 and Pacific Digital Cellular (PDC).

The GSM standard specifies communications in a time divided format (in multiple channels). The GSM standard specifies a 4.615 ms frame that includes 8 slots of, each including eight slots of approximately 577 µs in duration. Each slot corresponds to a Radio Frequency (RF) burst. A normal RF burst, used to transmit information, typically includes a left side, a midamble, and a right side. The midamble typically contains a training sequence whose exact configuration depends on modulation format used. However, other types of RF bursts are known to those skilled in the art. Each set of four bursts on the forward link carry a partial link layer data block, a full link layer data block, or multiple link layer data blocks. Also included in these four bursts is control information intended for not only the wireless terminal for which the data block is intended but for other wireless terminals as well.

A wireless terminal is a complex system that requires an advanced communications protocol stack, interoperability with many network vendors' equipment and support for rich multimedia applications within the constraints of a resource-limited embedded system. Additionally, as operators begin to deploy GPSS, EDGE and 3G networks and services, users demand the latest features and applications. This in turn creates shortened product lives. This shortened product life makes the development time for new wireless terminals with the latest features, and, more importantly, the time required to obtain certification, operator approval, and mass produce the wireless terminal a key issue. The time required to develop the software for the wireless terminal is a significant part of the development time.

As new technologies such as EDGE (an evolution of GPRS) are incorporated, these technologies must be proven reliable. Otherwise, difficulties originally encountered in prior technologies will be repeated. Critical factors for software development must be met and these factors include platform quality, application integration quality and product quality. Reference designs provide a quality base on which to build a quality product.

There are three key components to wireless terminal software. These include the protocol stack, applications framework, and applications. Many consider the protocol stack to be the most complex part. However, interactions between the framework and applications are equally important.

The protocol stack implements the signaling specification and is implemented on Digital Signal Processors (DSPs) and micro controllers such as Advanced RISC Machines (ARMs). These processors execute the various CODECs, radio resource management, mobility management, call management, and data management. The application framework delivers a platform to create wireless terminals with differing functionality and applications. Three broad components to the applications framework support (1) functions and services; (2) call control; and (3) application program interfaces (APIs). The applications typically include a Wireless Application Protocol (WAP) browser for online access, a Multimedia Messaging Service (MMS) client for picture messaging and a Java 2 platform.

Previously, these complex wireless terminals have not been tested efficiently and effectively in a timely manner by relying on the end product. Also, this testing has not occurred in isolation from the GSM network. To provide adequate test coverage so that the end product can be considered ready for deployment, a complete test system and process is needed that allows testing in a timely manner.

BRIEF SUMMARY OF THE INVENTION

In order to overcome the shortcomings of prior protocol certification and testing systems and methods, the present invention provides a system and method to test a protocol stack to be loaded and implemented within a wireless terminal. More specifically, the present invention allows simulation scripts to be easily created from logs from actual wireless terminals for use in testing the protocol stack in a simulation environment.

This testing involves the retrieving of simulation scripts from a library, wherein the simulation scripts have been created during situations encountered by actual wireless terminals. The simulation scripts are then loaded within a simulation environment within a personal computer or other computing device. The protocol stack may be executed within the simulation environment to produce a simulation result. These results may be saved and compared with a reference log. A favorable comparison between the simulation results and the reference log indicates satisfactory performance of the protocol stack. This allows the protocol stack to be optimized for a given hardware configuration associated with a wireless terminal.

This allows the simulation process to be introduced earlier in the development of the wireless terminal and associated hardware set. Simultaneous development of the protocol stack and wireless terminal greatly reduce the cycle time to develop the end product. This benefit derives from the fact that previous solutions were often unable to begin full testing of the protocol stack until the hardware had been physically implemented. This additionally avoids having to physically deploy the end product with an initial protocol stack to different locations such as Europe and Asia in order to test the performance of the protocol stack in actual conditions.

Another embodiment of the present invention may retrieve a log associated with a failure from a deployed wireless terminal and create a simulation script there from that addresses the particular failure. This allows problems that occur in the field to be addressed rather than requiring their recreation. Additionally, the simulation need not be run in real time but may be stopped or have specific portions of the simulation executed at a reduced speed. This ability clearly helps those designing the protocol stack to address problems as they are encountered. By testing the revised protocol stack against the new simulation script and previous simulation scripts, previous problems are avoided as well. This ensures that solutions do not create problems with previously performed tests.

Another embodiment of the present invention provides a set of software tools that converts case logs from wireless terminals to simulation scripts which may be used to test protocol stacks that are to be implemented within deployed wireless terminal. This software tool may receive the prior case log from a wireless terminal. A converter module then renders the received case log into a simulation script. The simulation script may be stored within a reference library. In addition to simulation scripts, the reference library may contain reference logs associated with particular simulation scripts. The simulation scripts may be unique to a specific hardware set or may be common across many hardware sets for the wireless terminals. The software tool creates a simulation environment based on loading the simulation script. Regression testing allows analysis of the protocol stack within the simulation environment and produces simulation results. A comparison module compares the simulation results to a reference log where a favorable comparison indicates a satisfactory performance of the protocol stack. An unfavorable comparison indicates the presence of an error within the protocol stack. Developers may then detect, locate and correct the error to produce a revised protocol stack. This interactive process may be repeated until no errors are encountered for any scripts associated with that wireless terminal.

A third embodiment provides a wireless terminal that implements a protocol stack wherein the protocol stack manages the operations of the radio frequency (RF) front end, baseband processor, CODEC processing module, and presentation interface. This protocol stack allows the front end to receive and process RF bursts to produce a baseband signal. The baseband signal may be processed to produce a data block in an encoded format in accordance with the protocol stack. Furthermore, the protocol stack allows a CODEC processing module to receive and decode the encoded format data block and present the data therein to the user through an audio or graphical interface. This protocol stack is developed and tested with a software tool that uses simulation scripts derived from prior test case logs retrieved from actual wireless terminals. This allows the protocol stack to be simultaneously developed concurrent to the development of the hardware of the wireless terminal. This software tool converts prior test case logs from wireless terminals to simulation script. Then the software tool allows the simulation script to be implemented within a simulation environment with the protocol stack under development to test the protocol stack prior to physically implementing the hardware set.

DETAILED DESCRIPTION OF THE INVENTION

Preferred embodiments of the present invention are illustrated in the Figures, like numerals being used to refer to like and corresponding parts of the various drawings.

Figure 1:
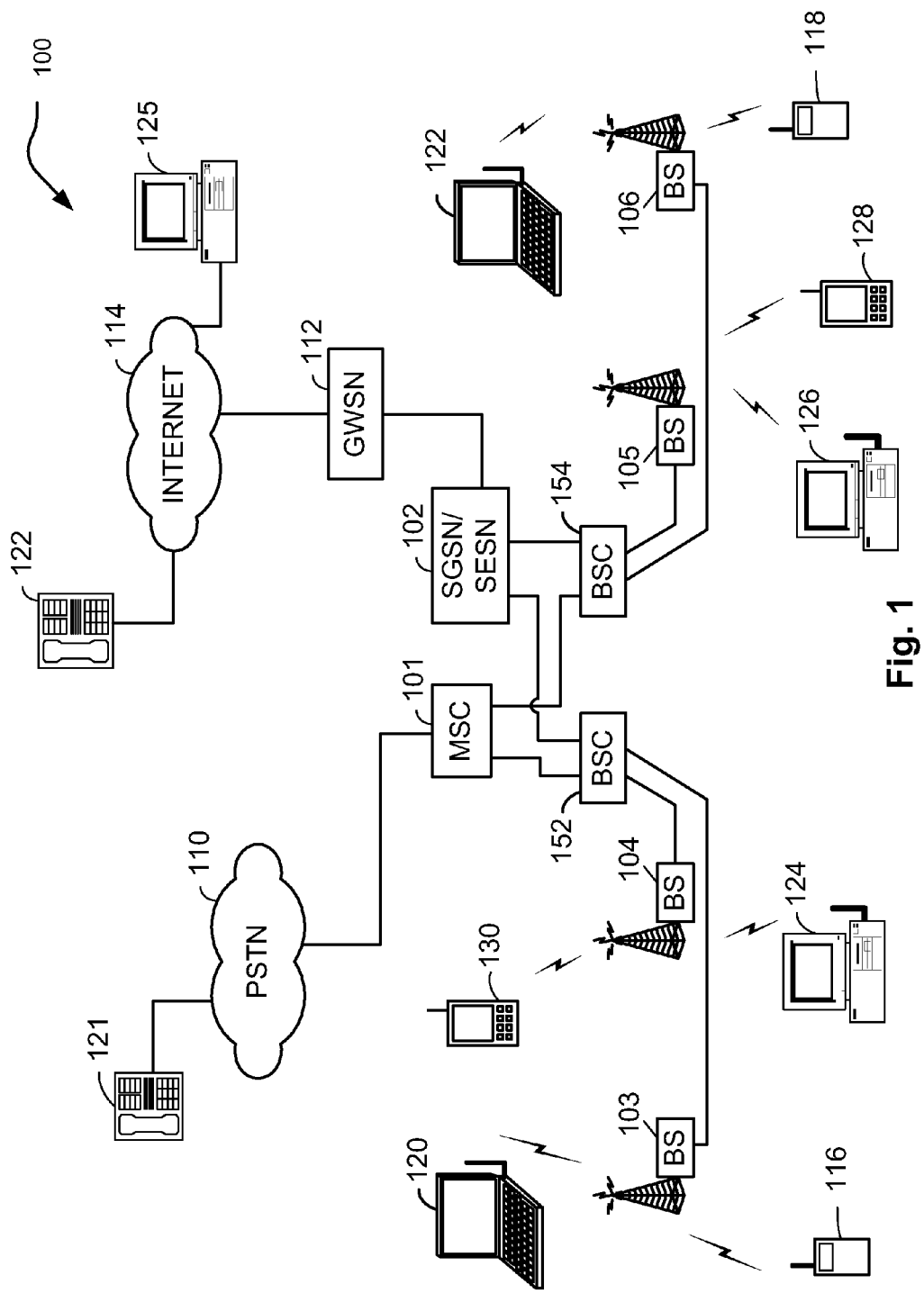
FIG. 1 is a system diagram illustrating a portion of a cellular wireless communication system that supports wireless terminals operating according to the present invention.

FIG. 1 is a system diagram illustrating a portion of a cellular wireless communication system 100 that supports wireless terminals operating according to the present invention. The cellular wireless communication system 100 includes a Mobile Switching Center (MSC) 101, Serving GPRS Support Node/Serving EDGE Support Node (SGSN/SESN) 102, base station controllers (BSCs) 152 and 154, and base stations 103, 104, 105, and 106. The SGSN/SESN 102 couples to the Internet 114 via a GPRS Gateway Support Node (GGSN) 112. A conventional multimedia capable terminal 121 couples to the PSTN 110. Multimedia capable terminal 123 and a personal computer 125 couple to the Internet 114. The MSC 101 couples to the Public Switched Telephone Network (PSTN) 110.

Each of the base stations 103-106 services a cell/set of sectors within which it supports wireless communications. Wireless links that include both forward link components and reverse link components support wireless communications between the base stations and their serviced wireless terminals. These wireless links support digital voice, video, multimedia, and data communications. Data compression allows an increase of the total number of wireless terminals serviced by the base stations. The cellular wireless communication system 100 may also be backward compatible in supporting analog operations as well. The cellular wireless communication system 100 supports the Global System for Mobile telecommunications (GSM) standard and also the Enhanced Data rates for GSM (or Global) Evolution (EDGE) extension thereof. The cellular wireless communication system 100 may also support the GSM General Packet Radio Service (GPRS) extension to GSM. However, the present invention is also applicable to other standards as well, e.g., TDMA standards, CDMA standards, etc.

Wireless terminals 116, 118, 120, 122, 124, 126, 128, and 130 couple to the cellular wireless communication system 100 via wireless links with the base stations 103-106. As illustrated, wireless terminals may include video and multimedia capable cellular telephones 116 and 118, laptop computers 120 and 122, desktop computers 124 and 126, and data terminals 128 and 130. However, the wireless system supports communications with other types of wireless terminals as known to those skilled in the art as well. As is generally known, devices such as laptop computers 120 and 122, desktop computers 124 and 126, data terminals 128 and 130, and cellular telephones 116 and 118, are enabled to "surf" the Internet 114, transmit and receive data, audio and video communications. Many of these operations have significant download data-rate (forward link) requirements and upload data-rate (reverse link) requirements in order to support video and multimedia communications. Some or all of the wireless terminals 116-130 are therefore enabled to support the EDGE operating standard, the GSM standard and may support the GPRS standard.

Wireless terminals 116-130 support the pipelined processing of received RF bursts in slots of a GSM frame so that a plurality of slots in each sub-frame of a GSM frame are allocated for forward link transmissions to a single wireless terminal. In one embodiment, a number of slots of a GSM frame are allocated for forward link transmissions to a wireless terminal such that the wireless terminal must receive and process a number of RF bursts, e.g., 2, 3, 4, or more RF bursts, in each GSM frame. The wireless terminal is able to process the RF bursts contained in these slots and still service reverse link transmissions and the other processing requirements of the wireless terminal.

Figure 2:
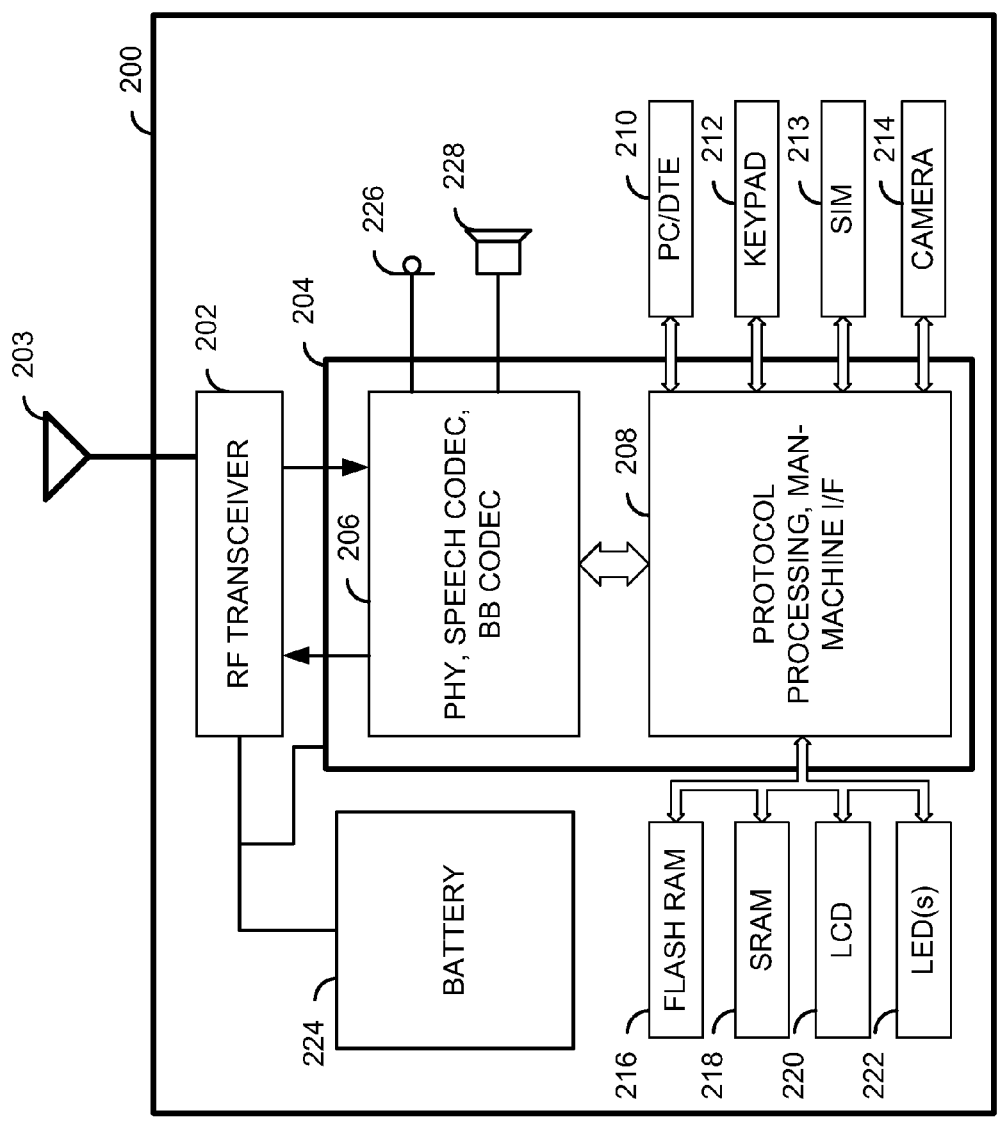
FIG. 2 is a block diagram functionally illustrating a wireless terminal constructed according to the present invention.

FIG. 2 is a block diagram functionally illustrating a wireless terminal 200 constructed according to the present invention. The wireless terminal 200 of FIG. 2 includes an RF transceiver 202, digital processing components 204, and various other components contained within a case. The digital processing components 204 includes two main functional components, a physical layer processing, speech COder/DEcoder (CODEC), and baseband CODEC functional block 206 and a protocol processing, man-machine interface functional block 208. A Digital Signal Processor (DSP) is the major component of the physical layer processing, speech COder/DECoder (CODEC), and baseband CODEC functional block 206 while a microprocessor, e.g., Reduced Instruction Set Computing (RISC) processor, is the major component of the protocol processing, man-machine interface functional block 208. The DSP may also be referred to as a Radio Interface Processor (RIP) while the RISC processor may be referred to as a system processor. However, these naming conventions are not to be taken as limiting the functions of these components. The development and testing of any protocol stack for these processors will be discussed further with respect to FIGS. 9-11.

The RF transceiver 202 couples to an antenna 203, to the digital processing components 204, and also to a battery 224 that powers all components of the wireless terminal 200. The physical layer processing, speech COder/DECoder (CODEC), and baseband CODEC functional block 206 couples to the protocol processing, man-machine interface functional block 208 and to a coupled microphone 226 and speaker 228. The protocol processing, man-machine interface functional block 208 couples to a Personal Computing/Data Terminal Equipment interface 210, a keypad 212, a Subscriber Identification Module (SIM) port 213, a camera 214, a flash RAM 216, an SRAM 218, a LCD 220, and LED(s) 222. The camera 214 and LCD 220 may support either/both still pictures and moving pictures. Thus, the wireless terminal 200 of FIG. 2 supports video services as well as audio services via the cellular network.

Figure 3:
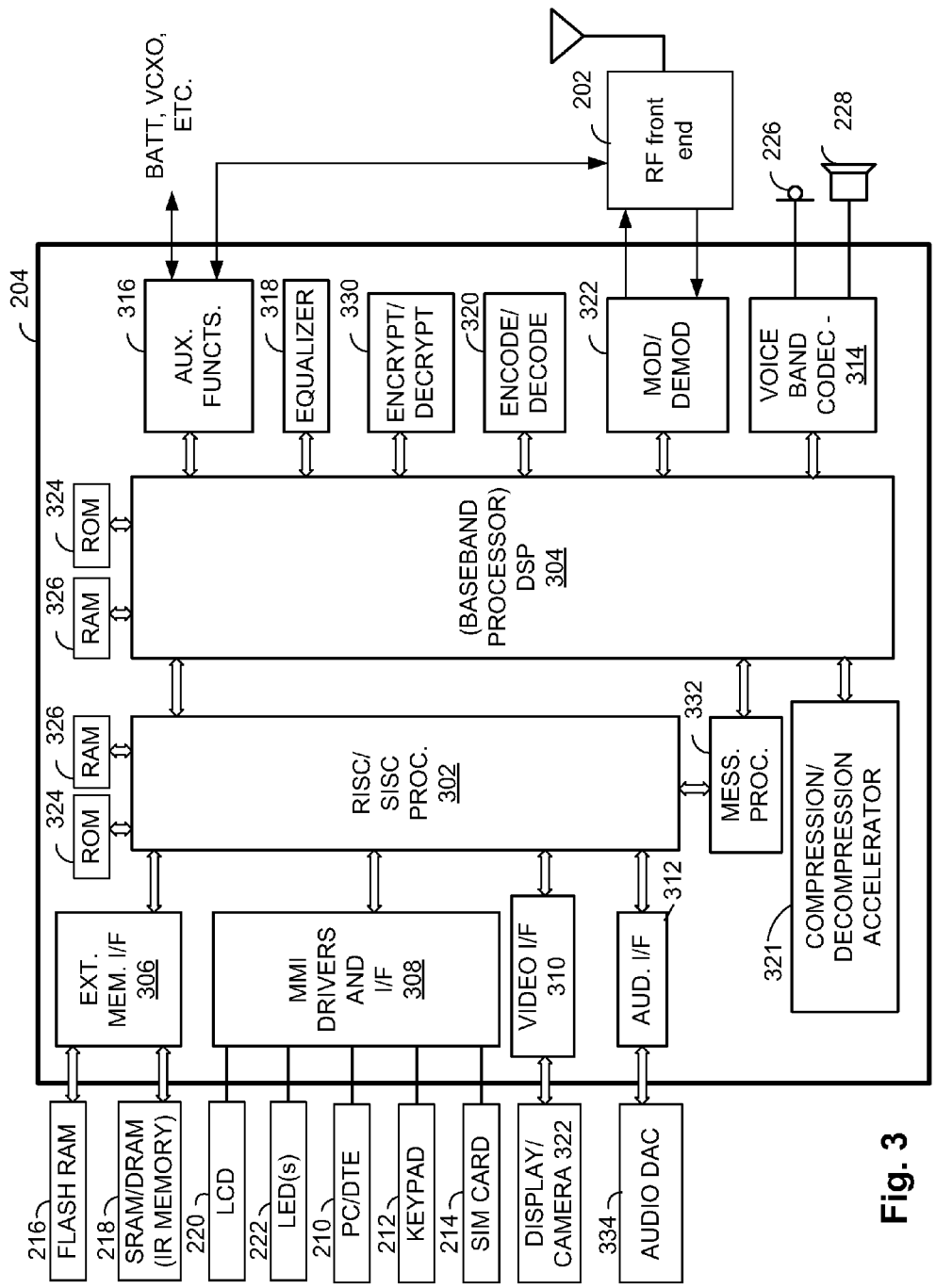
FIG. 3 is a block diagram illustrating in more detail the wireless terminal of FIG. 2, with particular emphasis on the digital processing components of the wireless terminal.

FIG. 3 is a block diagram illustrating in more detail the wireless terminal of FIG. 2, with particular emphasis on the digital processing components of the wireless terminal. The digital processing components 204 include a system processor 302, a baseband processor 304, and a plurality of supporting components. The supporting components include an external memory interface 306, MMI drivers and I/F 308, a video I/F 310, an audio I/F 312, a voice band CODEC 314, auxiliary functions 316, a modulator/demodulator 322, ROM 324, RAM 326 and a plurality of processing modules. In some embodiments, the modulator/demodulator 322 is not a separate structural component with these functions being performed internal to the baseband processor 304.

The processing modules are also referred to herein as accelerators, co-processors, processing modules, or otherwise, and include auxiliary functions 316, an equalizer module 318, an enCOder/DECoder (CODEC) processing module 320, a compression/decompression accelerator 321, and a video process accelerator module 328. The interconnections of FIG. 3 are one example of a manner in which these components may be interconnected. Other embodiments support additional/alternate couplings. Such coupling may be direct, indirect, and/or may be via one or more intermediary components.

RAM and ROM service both the system processor 302 and the baseband processor 304. Both the system processor 302 and the baseband processor 304 may couple to shared RAM 326 and ROM 324, couple to separate RAM, couple to separate ROM, couple to multiple RAM blocks, some shared, some not shared, or may be served in a differing manner by the memory. In one particular embodiment, the system processor 302 and the baseband processor 304 couple to respective separate RAMs and ROMs and also couple to a shared RAM that services control and data transfers between the devices. The processing modules 316, 318, 320, 322, and 328 may coupled as illustrated in FIG. 3 but may also coupled in other manners in differing embodiments.

System processor 302 services at least a portion of a serviced protocol stack, e.g., GSM/GPRS/EDGE protocol stack. Baseband processor 304 in combination with the modulator/demodulator 322, RF transceiver 202, equalizer module 318, and/or encoder/decoder module 320, service the Physical Layer (PHY) operations performed by the digital processing components 204. Baseband processor 304 may also service a portion of the GSM/GPRS/EDGE protocol stack. As previously stated, the development of this protocol stack will be further discussed with reference to FIGS. 9-11.

Still referring to FIG. 3, baseband processor 304 controls the interaction of the baseband processor 304 and equalizer module 318. Baseband processor 304 is responsible for causing the equalizer module 318 and the CODEC processing module 320 to process received RF bursts that reside within slots of a GSM frame. In the particular embodiment of FIGS. 2 and 3, with a single RF front end 202, wireless terminal 200 may receive and process RF bursts in up to four slots of each GSM frame, i.e., be assigned four slots for forward link transmissions in any particular GSM frame. In another embodiment in which the wireless terminal 200 includes more than one RF front end, the wireless terminal 200 may be assigned more than four slots in each sub-frame of the GSM frame. In this case, the required transmit operations would be performed using a second RF front end while a first RF front end would perform the receive operations. When the forward link transmissions and the reverse link transmissions occupy different channels with sufficient frequency separation, and the wireless terminal otherwise supports full duplex operations, the wireless terminal could receive and transmit at the same time.

The combination of the RF front end 202, and baseband processor 204, which may include an optional CODEC processing module, receive RF communications that may contain audio, visual, and data information from the servicing base station. In one embodiment, RF front end 202 and baseband processor 204 receive and process RF bursts from servicing base stations. The combination of RF front end 202 and baseband processor 204 are operable to receive RF bursts transmitted according to a transmission scheme wherein the transmission scheme includes both a modulation format and a coding format. Baseband processor 204, to produce a data block, decodes sequences of soft decisions extracted from the RF bursts. The sequence of soft decisions may decode successfully into the data block as indicated by error correction coding results.

Figure 4:
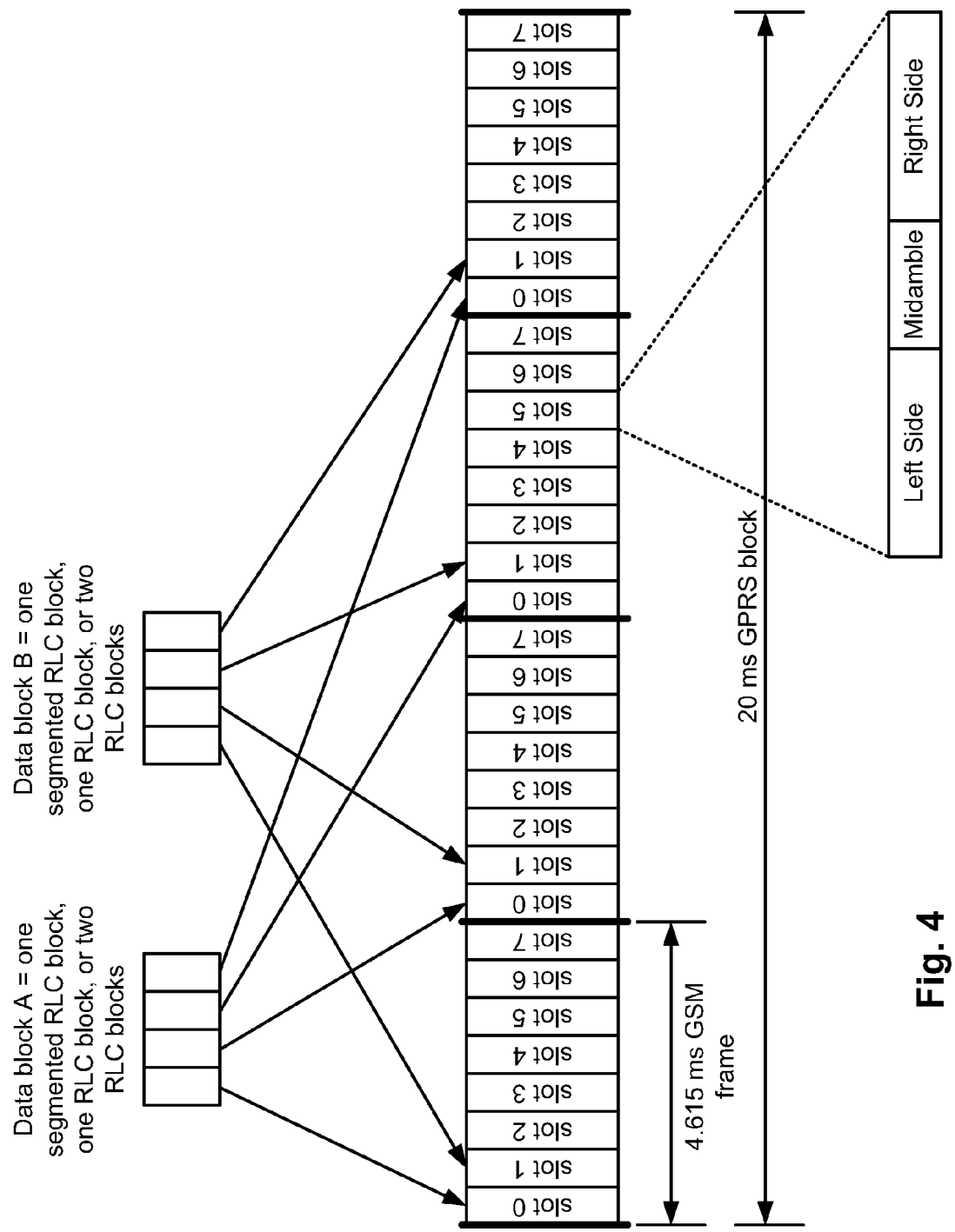
FIG. 4 is a block diagram illustrating the general structure of a GSM frame and the manner in which data blocks are carried by the GSM frame.

FIG. 4 is a block diagram illustrating the general structure of a GSM frame and the manner in which data blocks that may contain audio, video, and data communications are carried by the GSM frame. The GSM frame is 4.615 ms in duration, including guard periods, and each of which includes eight slots, slots 0 through 7. Each slot is approximately 577 μs in duration, includes a left side, a midamble, and a right side. The left side and right side of a normal RF burst of the time slot carry data while the midamble is a training sequence.

The RF bursts of four time slots of the GPRS block carry a segmented Radio Link Control (RLC) block, a complete RLC block, or two RLC blocks, depending upon a supported Modulation and Coding Scheme (MCS) mode. For example, data block A is carried in slot 0 of sub-frame 1, slot 0 of sub-frame 2, slot 0 of sub-frame 3, and slot 0 of sub-frame 3. Data block A may carry a segmented RLC block, an RLC block, or two RLC blocks. Likewise, data block B is carried in slot 1 of sub-frame 1, slot 1 of sub-frame 2, slot 1 of sub-frame 3, and slot 1 of sub-frame 3. The MCS mode of each set of slots, i.e., slot n of each sub-frame, for the GSM frame is consistent for the GSM frame. Further, the MCS mode of differing sets of slots of the GSM frame, e.g., slot 0 of each sub-frame vs. any of slots 1-7 of each sub-frame, may differ. This ability allows LA to be implemented. As will be described further with reference to FIG. 5, wireless terminal 200 may be assigned multiple slots for forward link transmissions that must be received and processed by wireless terminal 200.

Figure 5:
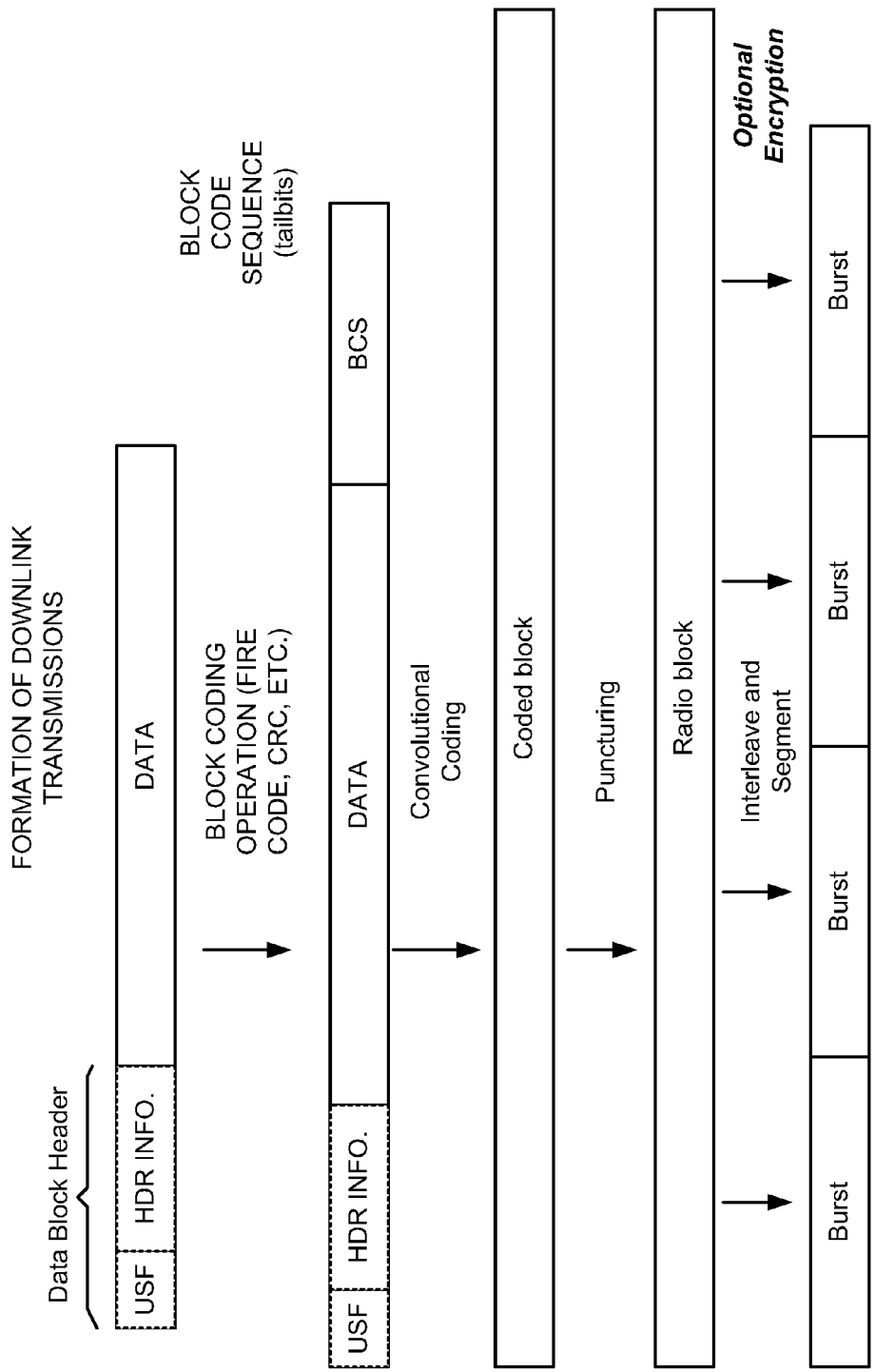
FIG. 5 is a block diagram illustrating the formation of down link transmissions.

FIG. 5 depicts the various stages associated with mapping data into RF bursts. A data block header and data are initially decoded. This data may already be compressed to optimize the size of the transmitted RF burst using a data compression protocol such as the V.42bis Compression Standard. The block coding operations perform the outer coding for the data block and support error detection/correction for data block. The outer coding operations typically employ a cyclic redundancy check (CRC) or a Fire Code. The outer coding operations are illustrated to add tail bits and/or a Block Code Sequence (BCS), which is/are appended to the data. After block coding has supplemented the data with redundancy bits for error detection, calculation of additional redundancy bits for error correction may be performed to correct for errors incurred during transmissions via the radio channels. The internal error correction or coding scheme of GSM is based on convolutional codes.

Some coded bits generated by the convolutional encoder are punctured prior to transmission. Puncturing increases the rate of the convolutional code and reduces the redundancy per data block transmitted. Puncturing additionally lowers the bandwidth requirements such that the convolutional encoded signal fits into the available channel bit stream. The convolutional encoded punctured bits are passed to an interleaver, which shuffles various bit streams and segments the interleaved bit streams into the 4 bursts shown.

Each RF burst has a left side, a midamble, and a right side. The left side and right side contain data. The midamble consists of predefined, known bit patterns, the training sequences, which are used for channel estimation to optimize reception with an equalizer and for synchronization. With the help of these training sequences, the equalizer eliminates or reduces the undesirable effects of inter-symbol interferences, which can be caused by propagation time differences of multipath propagation. A number of training sequences are defined for normal RF bursts in the GSM standard. However, the exact configuration of the training sequences may depend on the modulation format used. Each set of four bursts typically utilizes the same modulation format. By analyzing the training sequence one can determine the modulation format.

Figure 6:
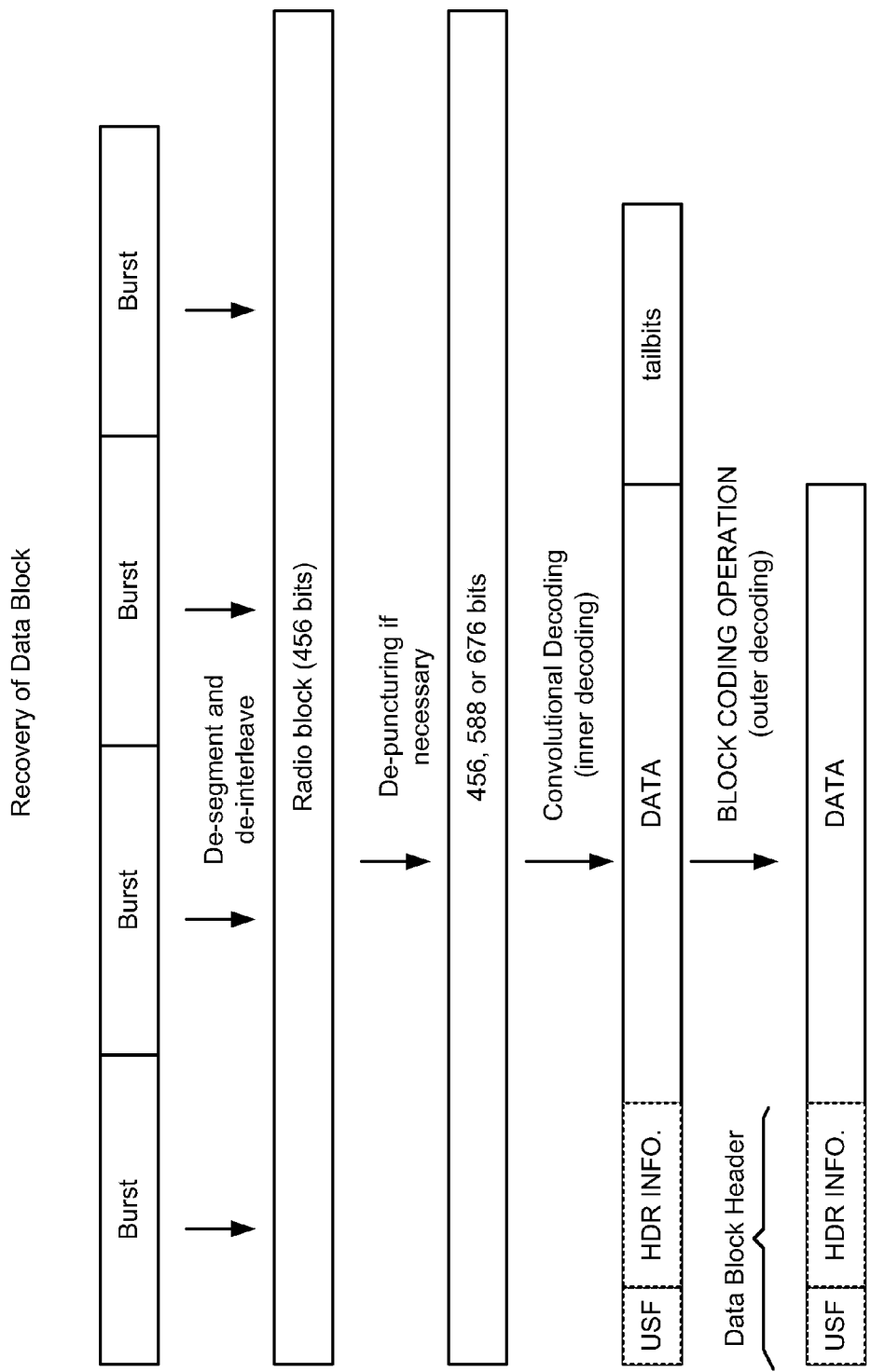
FIG. 6 is a block diagram illustrating the recovery of a data block from a down link transmissions.

FIG. 6 is a block diagram depicting the various stages associated with recovering a data block from RF bursts. Four RF bursts making up a data block are received and processed. Once all four RF bursts have been received, the RF bursts are combined to form an encoded data block. The encoded data block is then depunctured (if required), decoded according to an inner decoding scheme, and then decoded according to an outer decoding scheme. For MCS 1-4, the decoded data block includes the data block header and the data, for MCS 5-9, data block and header block are coded separately. Successful decoding may be signaled by appropriate tail bits appended to the data following convolutional decoding (error correction coding).

Figure 7:
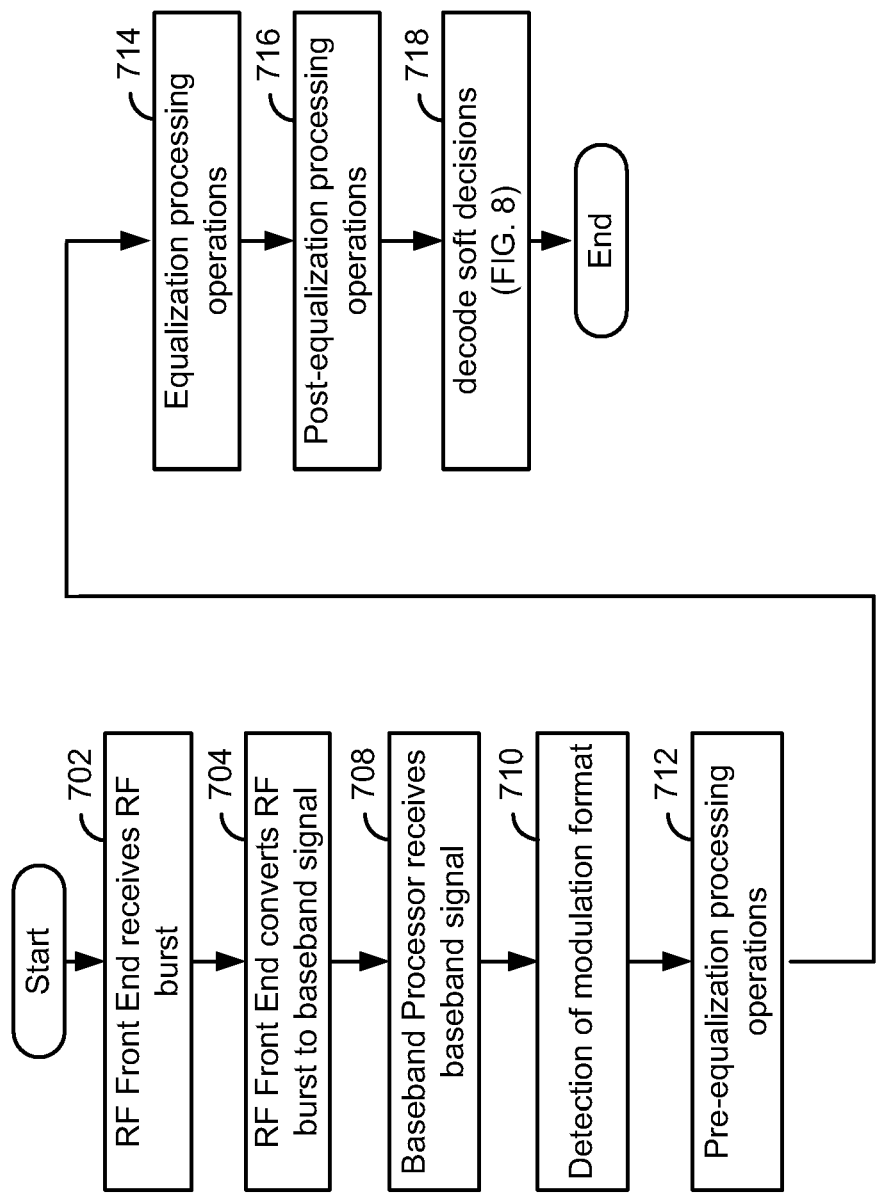
FIG. 7 is a flow chart illustrating operation of a wireless terminal in receiving and processing a RF burst.
Figure 8:
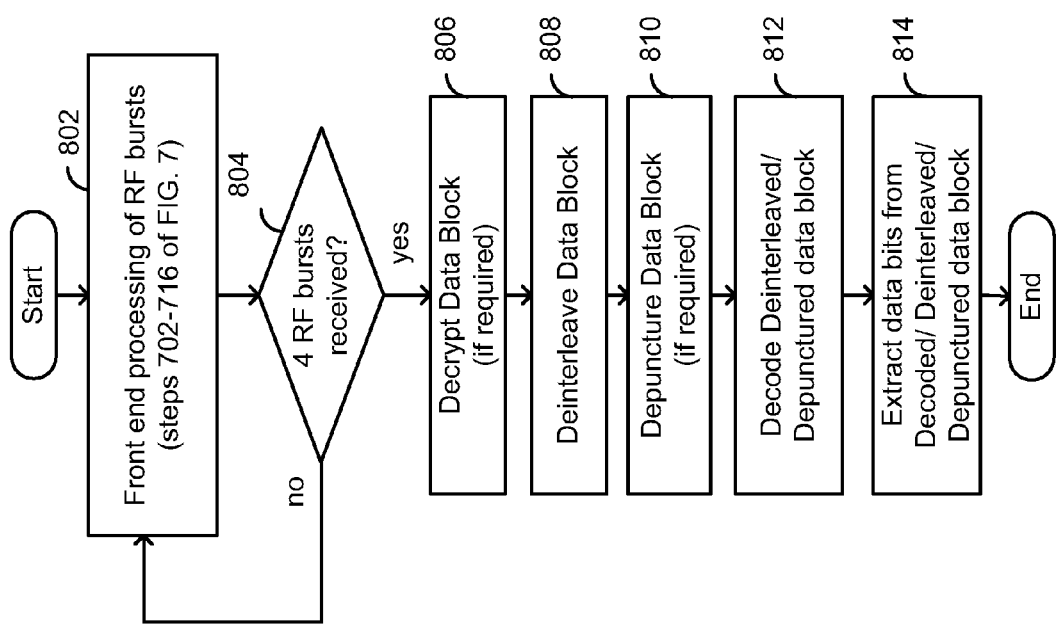
FIG. 8 is a flow chart illustrating operations to recover a data block.

FIGS. 7 and 8 are flow charts illustrating operation of wireless terminal 200 in receiving and processing RF bursts to recover a data block. The operations illustrated correspond to a single RF burst in a corresponding slot of GSM frame. RF front end 202, baseband processor 304, and equalizer module 318 illustrated in FIG. 3 perform these operations. These operations are generally called out as being performed by one of these components. However, the split of processing duties among these various components may differ without departing from the scope of the present invention.

Referring particularly to FIG. 7, operation commences with RF front end 202 receiving an RF burst in a corresponding slot of a GSM frame (step 702). RF front end 202 then converts the RF burst to a baseband signal (step 704). Upon completion of the conversion, RF front end 202 stores the converted baseband signal. When needed, the baseband processor samples the converted baseband signal from the RF front end. Thus, as referred to in FIG. 7, the RF front end 202 performs steps 702-704.

Operation continues with baseband processor 304 receiving the baseband signal (step 708). After receipt of the baseband signal (in a digitized format), the baseband processor performs detection of a modulation format of the baseband signal (step 710). This detection of the modulation format determines the modulation format of the corresponding baseband signal. According to the GSM standard, the modulation format will be either Gaussian Minimum Shift Keying (GMSK) modulation or Eight Phase Shift Keying (8 PSK) modulation. Baseband processor 304 makes the determination (step 712) and appropriately processes the RF bursts based upon the detected modulation format.

The baseband processor performs pre-equalization processing of the RF burst in step 712. The pre-equalization processing operations produce a processed baseband signal. Equalizer module 318 equalizes the processed baseband signal based upon the modulation format in step 714. Equalizer module 318 receives the processed baseband signal, settings, and/or parameters from baseband processor 304 and equalizes the processed baseband signal.

After equalization, the baseband processor receives the soft decisions from the equalizer module and performs "post-equalization processing" as shown in step 716. The sequence of soft decisions is decoded in step 718 to produce estimates of the data bits containing the audio, video and data communications. While the operations of FIG. 7 are indicated to be performed by particular components of the wireless terminal, such segmentation of operations could be performed by differing components. For example, baseband processor 304 or system processor 302 in other embodiments could perform the equalization operations. Further, baseband processor 304 or system processor 302 in other embodiments could also perform decoding operations.

A single processing device or a plurality of processing devices operably coupled to memory performs the processing duties. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing duties are implemented via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The processing duties include the execution of operational instructions corresponding to at least some of the steps and/or functions may be described later.

FIG. 8 is a flow chart illustrating operations to recover a data block. As shown in a block 802, the method performs front end processing of RF bursts (step 802, which may be viewed as including the steps 702-716 of FIG. 7). Then, in a decision block, 804, the method determines whether or not 4 RF bursts have been received. If they have not been received, the method returns to step 802. Alternatively, if the 4 RF bursts have been received, then the method performs decryption of the data block (if required) in step 806. The method continues by de-interleaving the data block in step 808. The method then continues by de-puncturing the data block (if required) in step 810.

The method operates by decoding the de-interleaved/de-punctured data block in step 812. The method continues by extracting data bits (i.e., estimating the data bits encoded therein) from the de-interleaved/de-punctured data block in step 814.

Figure 9:
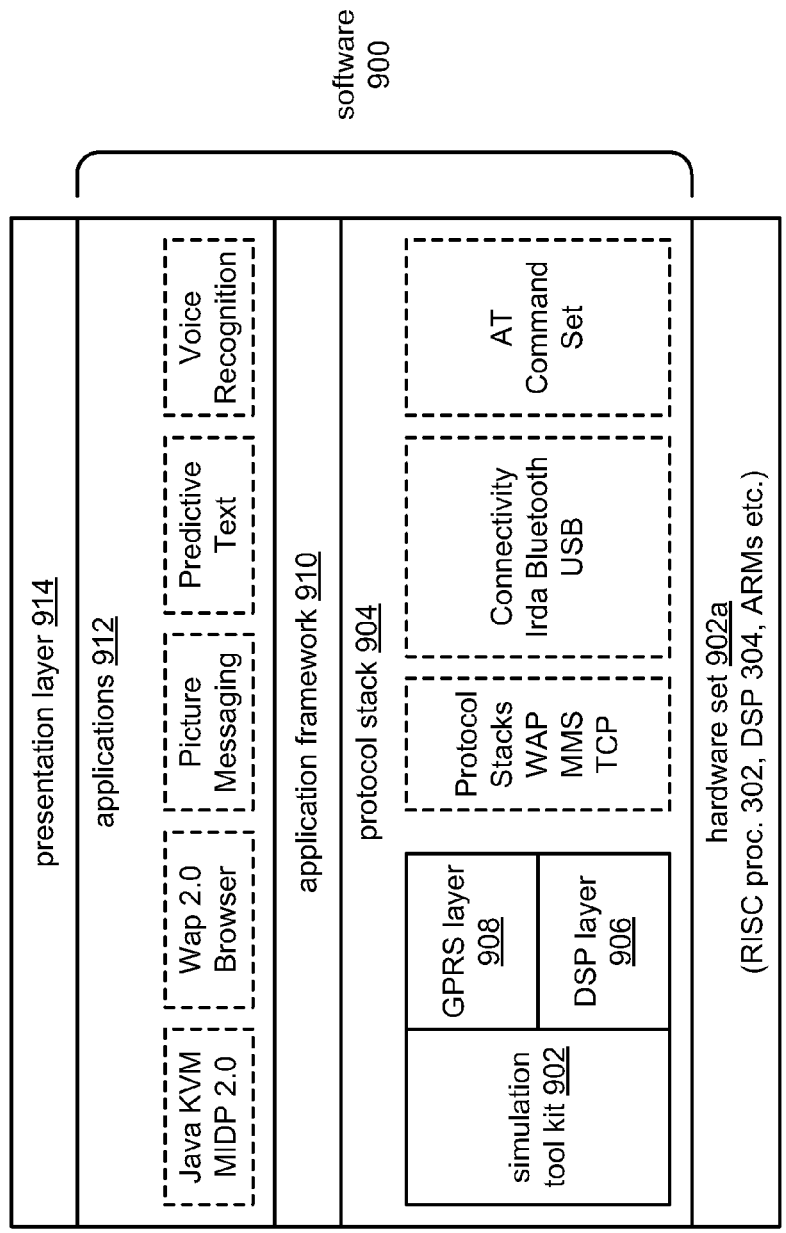
FIG. 9 is a block diagram illustrating the relationship of the differing levels of wireless terminal software (i.e. protocol stack, application framework, and applications)

Wire terminals require a complex software set as illustrated in FIG. 9. These terminals require a communications protocol stack having interoperability with many network vendors' equipment and able to support rich multimedia applications within the constraints of a resource-limited system. FIG. 9 illustrates the three-key components software 900 within a wireless terminal. These include the protocol stack 904, application framework 910 and applications 912. Protocol stack 904 is often considered to be the most complex part, however, the interaction between application framework 910 and applications 912 is equally important. Protocol stack 904 implements the GSM signaling specification and is implemented on digital signal processors such as DSP 304 and ARMS such as RISC processor 302 and numerous accelerators and co-processors illustrated in FIG. 3.

Software 900 allows hardware set 902*a* to achieve certain operations. Protocol stack 904 may further include DSP layer 906, as well as GPRS layer 908. Protocol stack 904, application framework 910, and applications 912 allow the user to interact with the wireless terminal through presentation layer 914. A wireless terminal is presented an advance communication protocol stack. Protocol stack 904 may be derived from case logs associated with the software operations of the wireless terminal.

As operations deploy GPRS, EDGE and 3G networks and services, users' demand for improved features and applications is increasing. Development time for new wireless terminals is required to be reduced, while the latest features are added. This reduced timeline to obtain certification, operator approval, and mass produce the wireless terminal, makes the time associated with developing the protocol stack a key issue. New technologies, such as EDGE, must be proven prior to development. Otherwise, difficulties originally encountered in prior technologies may be repeated.

Critical factors for software development must be met. These factors include platform quality, application integration quality and product quality. Reference designs provide a base from which to build a new product. Testing of new protocol stacks includes two key components, a simulation environment where the protocol stack is executed within a PC instead of the embedded system, and regression testing. The effect of adding new services, particularly new data services that use GPRS, EDGE and 3G, exercises the protocol stack in new ways. Therefore, regression testing ideally stimulates the full product and measures signals at points within the system required. However, efficient testing requires stimulation scripts. A client protocol stack needs to be tested in conjunction with various GSM/GPRS; EDGE/; or 3G networks. The stimulation environment should include real network traces used to stimulate the physical system. To achieve an effective simulation, the protocol stack be fully replicated down to the hardware set (i.e., including the DSP code).

Figure 10:
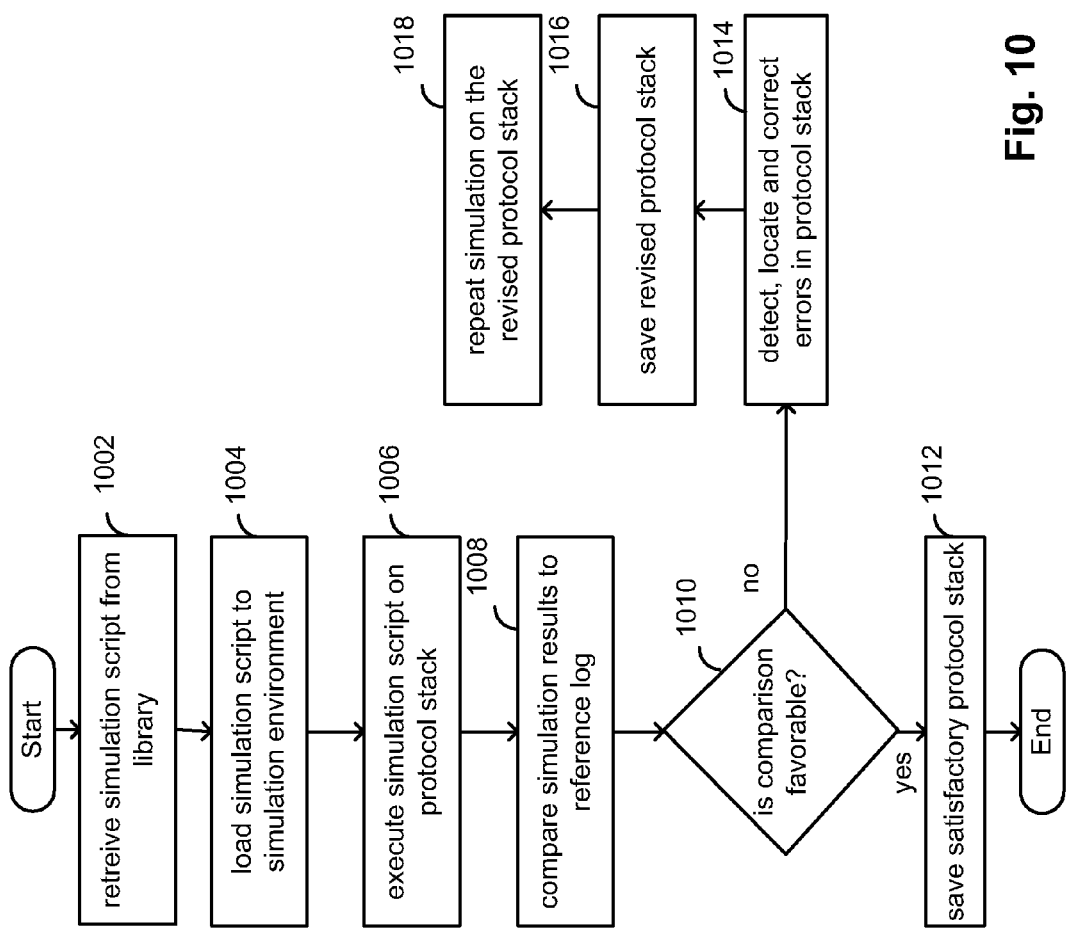
FIG. 10 provides a logic flow diagram illustrating one embodiment of the processes associated with regression testing in accordance with the present invention.

FIG. 10 provides a logic flow diagram illustrating the processes associated with regression testing. In step 1002, a simulation script is retrieved from a library. The development of this simulation script will be further discussed in FIG. 11. The simulation script is loaded into the simulation environment in step 1004. The script is then executed with the protocol stack in step 1006. This will produce simulation results which are compared to a reference log in step 1008. If the comparison is favorable, as determined at decision point 1010, the protocol stack may be determined to operate satisfactory and will be saved for future testing or deployment in step 1012. However, should the comparison be unfavorable at decision point 1010, an effort is made to detect, locate, and correct errors within the protocol stack in step 1014. This will produce a revised protocol stack which will be saved as in step 1016. The simulation will then be repeated on the revised protocol stack in step 1018. This interactive protocol will continue until a favorable comparison results at decision point 1010. FIG. 10 illustrates the procedure for testing a single script. However, numerous scripts may be involved in fully testing the protocol stack with the hardware set. Therefore, this process will be repeated on a complete set of simulation scripts applicable to this hardware set and desired features until testing of the protocol stack with all simulation scripts yields a favorable result.

These simulation scripts may take into account various testing and certification requirements. Testing ensures that the wireless terminal is ready for the global market. This required testing may take the form of the GSM market's Global Certification Forum (GCF). GCF is an independent program created by network operators and wireless terminal manufacturers to ensure global interoperability devices. GCF provides a comprehensive testing program for functionality that ensures interoperability across the different networks. U.S. operators have a similar process implemented by the PCS type Certification Review Board. As new features are added, new tests are required. By providing software that more quickly develops needed simulation scripts, the time a manufacturer spends performing certification is greatly reduced, enabling faster time-to-market.

Internal development performs well; however, the acid test is how the protocol stacks work when deployed in wireless terminals. Field testing, interoperability testing, certification approvals and newly discovered errors are all part of the process. The present invention allows field testing to be duplicated without actually building the hardware and physically testing the device. Further, physical testing specific to various markets and geographies can be simulated more easily using simulation scripts generated as discussed in FIG. 11. Previously, this required performance in conjunction with manufacturers in the particular market for which the wireless terminal is intended. This builds up to full interoperability testing, the ultimate test of a wireless terminal. Previously, full interoperability testing was exclusively a real-world test using the full capabilities of the software and hardware with a real network.

Figure 11:
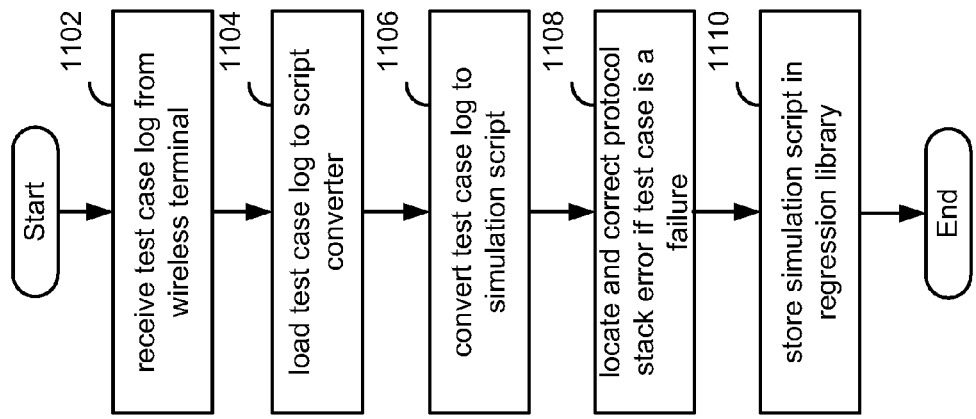
FIG. 11 provides a logic flow diagram detailing processes that eliminate much of the real world testing in product development in accordance with the present invention.

FIG. 11 provides a logic flow diagram detailing processes that eliminate much of the real world testing in product development. Test case logs, recorded by actual wireless terminals, provide specific instances where failures occurred or other like certifications. The present invention toolset 916 is operable to convert a log from an actual wireless terminal into a simulation script. That process log may begin when the wireless terminal is powered up until the specific situation is observed. Step 1102 of FIG. 11 shows the receipt of a case test log from a wireless terminal. The received test case log is loaded into a script converter in step 1104 to produce a simulation script in step 1106. If the test case is a failure, the process locates and corrects the protocol stack error(s) in step 1108. Then the simulation script is stored within a regression library in step 1110.

The converter uses a series of filters, databases, and other tools to convert the test case log into a simulation script. The databases include a table of all inter-task messages, with associated parameters, between different modules in the protocol stack, a table defining the data types of all parameters used in the inter-task (SDL) messages, and a table listing the protocol stack interfaces in which the messages are exchanged. The converter receives the test case log captured from a wireless device as an input and coverts the test case log into a simulation script appropriate for the simulation environment with the aid of the databases mentioned above. With separation of the databases from the converter, when one continues to develop and modify the protocol stack, he or she only needs to update the databases in this tool suite, avoiding the need to rewrite the converter and improving the efficiency of protocol stack development. Another important tool (parseSDLlog) may facilitate the comparison of the test case log from a wireless device and the simulation log from the simulation. After a simulation script is obtained through the above steps, one needs to confirm if the simulation is repeating the same scenario as what had happened on the wireless device.

The simulation log output from running the simulation script is often in a different format than the original wireless device log from which the script is created. Using the parseSDLlog tool, one can convert the simulation log back into a format compatible with the original wireless device log format, thus making the verification of the correctness of the script much easier. The parseSDLlog tool also facilitates the comparison of simulation log and reference log in the regression library during regression run. When doing regression run of the script library, the parseSDLlog tool helps to extract the most important information from the simulation log and from the reference log and then compare. That helps make the regression run more efficiently and reduce false alarm rate that a test case script is mistakenly considered broken by new protocol stack implementation or modification.

Platform quality, application integration quality and testing are all essential to produce a wireless terminal platform that meets the criteria required of today's operators. Field testing and interoperability testing provide invaluable sources of quality improvement data. The present invention allows this valuable feedback into the development of the protocol stack in order to continually improve and enhance its quality, stability and interoperability. The net effect is an improved and streamlined process to bring new and future technologies to market. Thus, the present invention helps to ensure software products (protocol stacks) are developed with the quality and within the timeframes that manufacturers demand.

Figure 12:
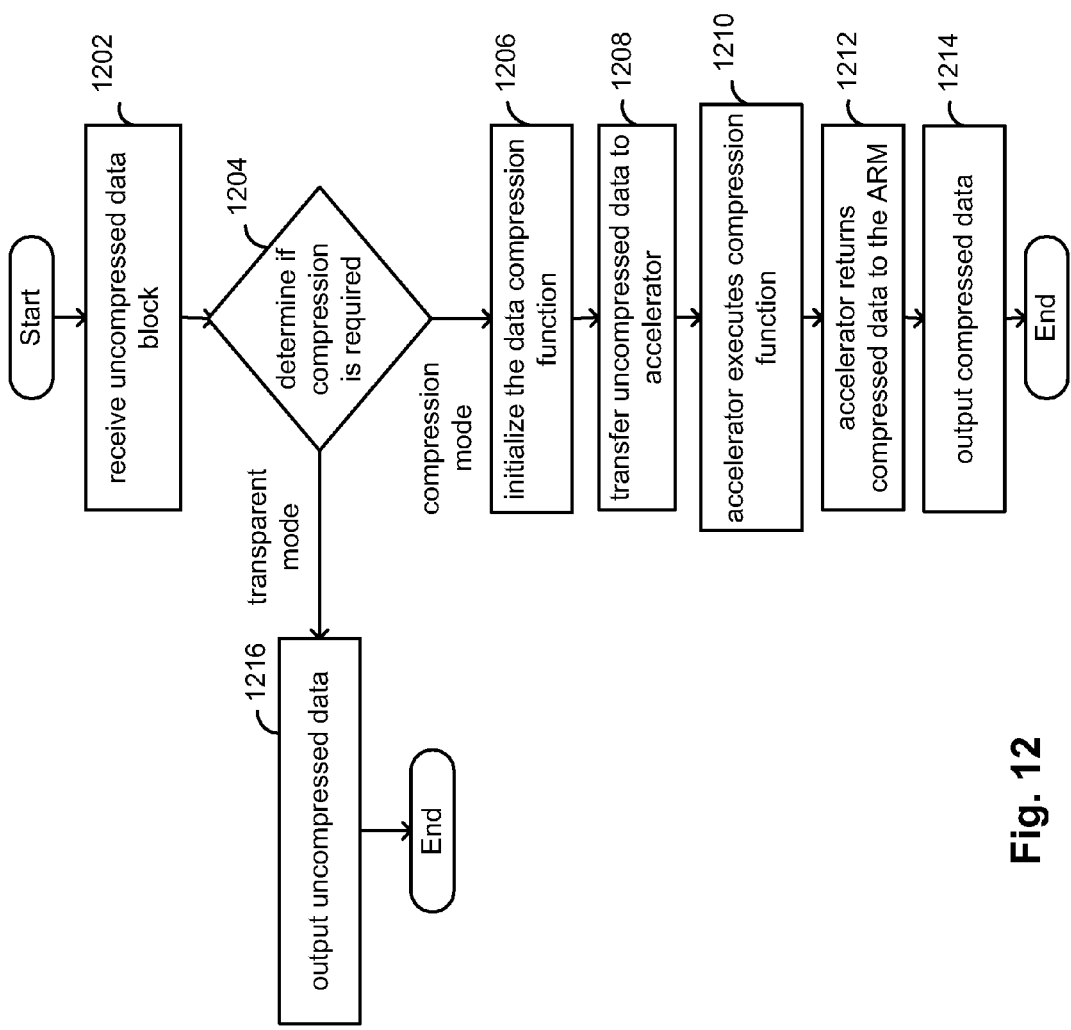
FIG. 12 is a diagram illustrating an embodiment of a method for processing a signal that includes RF bursts.

FIG. 12 is a diagram illustrating an embodiment of a method for processing a signal that includes RF bursts. The method begins by receiving an uncompressed data block as shown in step 1202. The method then continues by determining if compression is required in a decision step 1204. If operating in a transparent mode, then no compression is needed and the uncompressed data is output in step 1216.

Alternatively, if operating in the compression mode, then the method operates by initializing the data compression function in step 1206. The uncompressed data then is transferred to an accelerator in step 1208. The accelerator then executes a compression function on the uncompressed data in step 1210, and the compressed data is returned to the ARM in step 1212. The compressed data is then output in step 1214.

Figure 13:
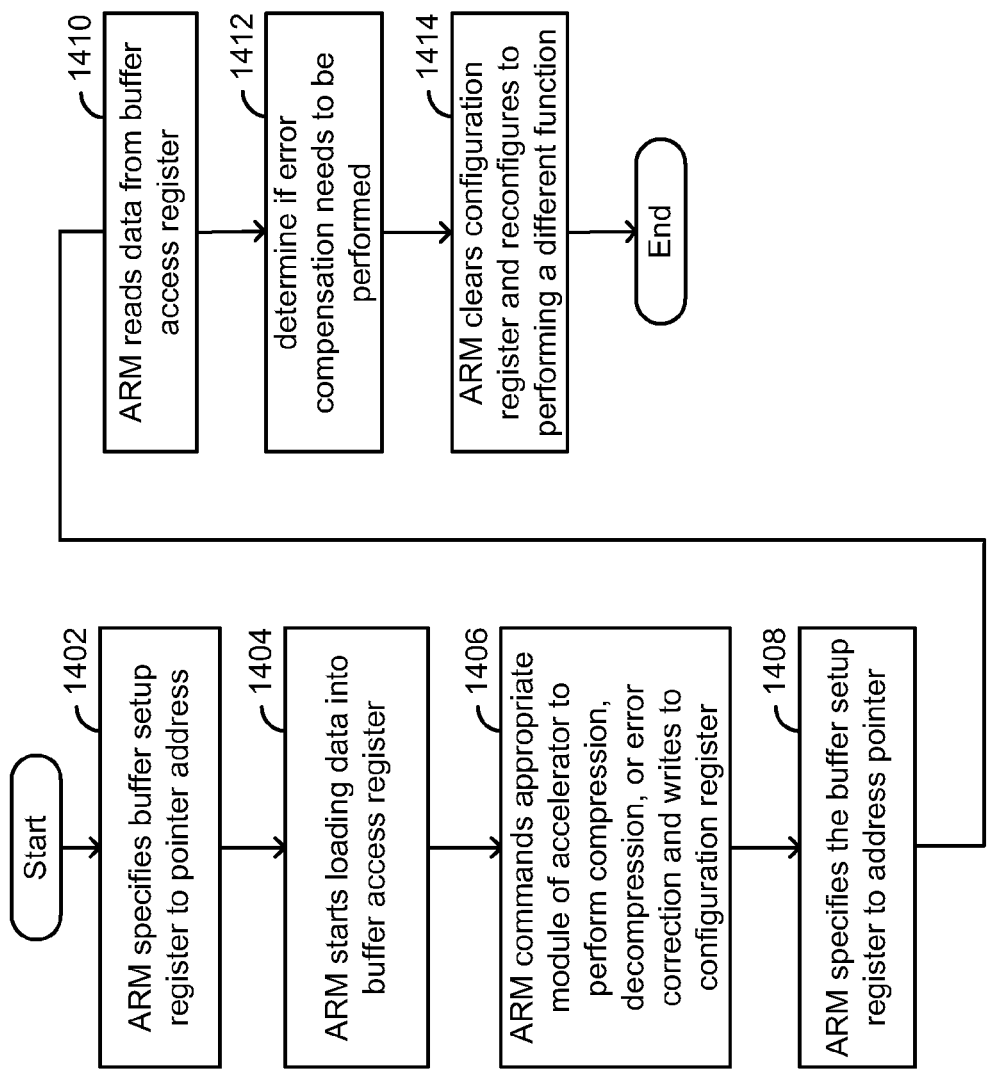
FIG. 13 is a diagram illustrating an embodiment of a method for operating an ARM.

FIG. 13 is a diagram illustrating an embodiment of a method for operating an ARM. The method operates by having the ARM specify a buffer setup register in step 1402. The ARM then starts loading the data into a buffer access register in step 1404.

The ARM then commands the appropriate module of the accelerator to perform compression, decompression, of error correction (e.g., as may be performed within a decoder) and writes this information to a configuration register in step 1406.

The ARM then specifies the buffer setup register to the address pointer in step 1408. The ARM then reads data from the buffer access register in step 1410. The method then operates to determine if error compensation needs to be performed in step 1412. After these steps are completed, the ARM then clears the configuration register and reconfigures itself to performing a different function in step 1414.

In summary, the present invention provides a system and method to test a protocol stack operable to be loaded to a wireless terminal. This involves the creation of simulation scripts from prior test case logs associated with a prior test case executed on a physical wireless terminal. When the prior test case has failed on a physical device, the simulation scripts are used to locate and correct errors in protocol stack. The simulation scripts are then stored within and retrieved from a library. These simulations scripts are loaded within a simulation environment within computer systems such as a personal computer. The simulation scripts are executed on the protocol stack within the simulation environment to produce a set of results. These results are then compared to a reference log, wherein a favorable comparison indicates a satisfactory simulation. Should an unfavorable comparison result, the protocol stack may be revised. The above process may then be repeated on the revised protocol stacks following the detection, location and correction of errors within the protocol stack.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Although the present invention is described in detail, it should be understood that various changes, substitutions and alterations can be made hereto without departing from the spirit and scope of the invention as described by the appended claims.

What is claimed is:

1. An apparatus, comprising non-transitory computer readable media for storing:
   a library module for storing a simulation script;
   a simulation environment module for generating a simulation environment corresponding to the simulation script; and
   a regression testing module for analyzing operation of a protocol stack of a wireless terminal within the simulation environment and producing simulation results corresponding to a plurality of execution steps of the protocol stack of the wireless terminal, wherein the simulation environment module operable to stop or operate the simulation environment corresponding to the simulation script at a speed that is different than real time.

2. The apparatus of claim 1, wherein:
   the simulation script is derived from a prior test case log of at least one additional wireless terminal implemented within a wireless communication system.

3. The apparatus of claim 2, wherein:
   the prior test case log is associated with a failure of the at least one additional wireless terminal implemented within the wireless communication system.

4. The apparatus of claim 1, wherein:
the apparatus operable to modify the protocol stack of the wireless terminal thereby generating a revised protocol stack of the wireless terminal based on the simulation results.

5. The apparatus of claim 1, further comprising:
a comparison module for comparing the simulation results with a reference log; and wherein:
a favorable comparison indicating a satisfactory performance of the protocol stack of the wireless terminal.

6. The apparatus of claim 5, wherein:
the reference log corresponds to at least one additional plurality of execution steps of at least one additional protocol stack of at least one additional wireless terminal implemented within a wireless communication system.

7. The apparatus of claim 6, wherein:
the regression testing module operable to analyze operation of the revised protocol stack of the wireless terminal within the simulation environment and produce at least one additional simulation results corresponding to at least one additional plurality of execution steps of the revised protocol stack of the wireless terminal.

8. The apparatus of claim 5, wherein:
the apparatus operable to modify the protocol stack of the wireless terminal thereby generating a revised protocol stack of the wireless terminal when the simulation results failing to compare favorably with the reference log.

9. The apparatus of claim 5, wherein:
the apparatus operable to identify the protocol stack of the wireless terminal as a satisfactory protocol stack when the simulation results comparing favorably with the reference log; and
the satisfactory protocol stack is then implemented within hardware of the wireless terminal.

10. The apparatus of claim 1, wherein:
the wireless terminal being a cellular telephone, a laptop computer, a desktop computer, or a data terminal.

11. The apparatus of claim 1, wherein:
the simulation script corresponds to at least one of Global Certification Forum (GCF) and PCS Type Certification Review Board (PTCRB) required testing, interoperability (IOT) lab testing, and live network testing.

12. An apparatus, comprising non-transitory computer readable media for storing:
a library module for storing a simulation script;
a simulation environment module for generating a simulation environment corresponding to the simulation script; and
a regression testing module for analyzing operation of a protocol stack of a wireless terminal within the simulation environment and producing simulation results corresponding to a plurality of execution steps of the protocol stack of the wireless terminal; and wherein:
the simulation script is derived from a prior test case log of at least one additional wireless terminal implemented within a wireless communication system;
the prior test case log is associated with a failure of the at least one additional wireless terminal implemented within the wireless communication system; and
the simulation environment module operable to stop or operate the simulation environment corresponding to the simulation script at a speed that is different than real time.

13. The apparatus of claim 12, further comprising:
a comparison module for comparing the simulation results with a reference log; and wherein:
a favorable comparison indicating a satisfactory performance of the protocol stack of the wireless terminal;
the apparatus operable to modify the protocol stack of the wireless terminal thereby generating a revised protocol stack of the wireless terminal when the simulation results failing to compare favorably with the reference log; and
the regression testing module operable to analyze operation of the revised protocol stack of the wireless terminal within the simulation environment and produce at least one additional simulation results corresponding to at least one additional plurality of execution steps of the revised protocol stack of the wireless terminal.

14. The apparatus of claim 13, wherein:
the apparatus operable to identify the protocol stack of the wireless terminal as a satisfactory protocol stack when the simulation results comparing favorably with the reference log; and
the satisfactory protocol stack is then implemented within hardware of the wireless terminal.

15. The apparatus of claim 12, wherein:
the simulation script corresponds to at least one of Global Certification Forum (GCF) and PCS Type Certification Review Board (PTCRB) required testing, interoperability (IOT) lab testing, and live network testing.

16. A method, comprising:
retrieving a simulation script from a library module;
generating a simulation environment corresponding to the simulation script;
performing regression testing to analyze operation of a protocol stack of a wireless terminal within the simulation environment and to produce simulation results corresponding to a plurality of execution steps of the protocol stack of the wireless terminal; and
stopping or operating the simulation environment corresponding to the simulation script at a speed that is different than real time.

17. The method of claim 16, further comprising:
comparing the simulation results with a reference log; and wherein:
a favorable comparison indicating a satisfactory performance of the protocol stack of the wireless terminal.

18. The method of claim 17, further comprising:
modifying the protocol stack of the wireless terminal thereby generating a revised protocol stack of the wireless terminal when the simulation results failing to compare favorably with the reference log; and
performing additional regression testing to analyze operation of the revised protocol stack of the wireless terminal within the simulation environment and producing at least one additional simulation results corresponding to at least one additional plurality of execution steps of the revised protocol stack of the wireless terminal.

19. The method of claim 16, wherein:
the wireless terminal being a cellular telephone, a laptop computer, a desktop computer, or a data terminal.

20. The method of claim 16, wherein:
the simulation script corresponds to at least one of Global Certification Forum (GCF) and PCS Type Certification Review Board (PTCRB) required testing, interoperability (IOT) lab testing, and live network testing.

* * * * *